(12) United States Patent
Koliopoulos (10) Patent No.: US 7,940,166 B2
(45) Date of Patent: May 10, 2011

(54) EMERGENCY ASSISTANCE BEACON SIGNAL METHODOLOGY AND SYSTEM FOR LAW ENFORCEMENT, EMERGENCY AND MILITARY PERSONNEL

(76) Inventor: Konstantinos Koliopoulos, Alpha, NJ (US)

( * ) Notice: Subject to any disclaimer, the term of this patent is extended or adjusted under 35 U.S.C. 154(b) by 367 days.

(21) Appl. No.: 12/154,797

(22) Filed: May 27, 2008

(65) Prior Publication Data

US 2009/0295560 A1    Dec. 3, 2009

(51) Int. Cl.
*B60Q 1/52* (2006.01)
*B60Q 1/00* (2006.01)

(52) U.S. Cl. ...... 340/471; 340/472; 340/982; 340/425.5; 340/555; 340/556; 362/479; 362/493

(58) Field of Classification Search ........... 340/471, 340/472, 982, 983
See application file for complete search history.

(56) References Cited

U.S. PATENT DOCUMENTS

| | | | |
|---|---|---|---|
| 2,025,064 A * | 12/1935 | Marsters ............. 362/422 |
| 3,290,597 A | 12/1966 | Denny et al. | |
| 3,469,235 A | 9/1969 | Devlin et al. | |
| 3,601,797 A | 8/1971 | O'Connor | |
| 3,723,725 A | 3/1973 | Jaeger | |
| 3,863,999 A | 2/1975 | Muller | |
| 3,947,815 A | 3/1976 | Muncheryan | |
| 4,058,794 A | 11/1977 | Menke | |
| 4,388,609 A * | 6/1983 | Menke ............. 340/471 |
| 4,606,073 A | 8/1986 | Moore | |
| 4,847,589 A | 7/1989 | Dobbins | |
| 5,057,985 A * | 10/1991 | Kreutzer et al. ............. 362/425 |
| 5,287,104 A * | 2/1994 | Shemwell ............. 340/952 |
| RE34,677 E | 7/1994 | Ray et al. | |
| 5,389,935 A | 2/1995 | Drouault et al. | |
| 5,422,623 A | 6/1995 | Bader et al. | |
| 5,892,439 A | 4/1999 | Molina Torres et al. | |
| 5,929,788 A * | 7/1999 | Vukosic ............. 340/908.1 |
| 6,549,121 B2 | 4/2003 | Povey et al. | |
| 2002/0070929 A1 | 6/2002 | Hunter | |
| 2005/0099317 A1 | 5/2005 | Pederson | |

* cited by examiner

*Primary Examiner* — Donnie L Crosland
(74) *Attorney, Agent, or Firm* — Kenneth Glynn, Esq.

(57) ABSTRACT

The present invention relates to an emergency assistance beacon signal methodology for law enforcement, emergency and military personnel by which such personnel who encounter an imminent need for assistance or rescue while on duty in a vehicle, may utilize such methodology to invite the assistance or rescue of other such personnel. Upon a first personnel determining that assistance or rescue is needed, the first personnel activate a powerful light element attached to a such that the powerful light directs a beam of light upwardly and non-horizontally from the vehicle. Upon a second personnel recognizing the beam of light, travels to a general area of the beam of light to locate the first and provides first personnel assistance or rescue. In another embodiment of the present invention, an emergency assistance beacon signal system includes a) a roof-mountable emergency signal device for mounting on the roof of a law enforcement, emergency or military vehicle, the device including an upwardly, non-horizontally directed powerful light source having at least one upwardly, non-horizontally directed beam of light adapted to be energized by an activation mechanism operable by a personnel who is using the vehicle; and, b) the activation mechanism in proximity to and operable by the officer who is using the vehicle.

21 Claims, 6 Drawing Sheets

EMERGENCY ASSISTANCE BEACON SIGNAL METHODOLOGY AND SYSTEM FOR LAW ENFORCEMENT, EMERGENCY AND MILITARY PERSONNEL

BACKGROUND OF INVENTION a. Field of Invention

The present invention relates to the general field of providing protection to law enforcement, emergency and military personnel upon encountering an imminent need for assistance or rescue. More particularly, the present invention includes a method and system for such personnel in danger who activate an upwardly, non-horizontally powerful light source to alert other law enforcement, emergency and military personnel in the area of the need for immediate assistance. The present invention provides rapid visual location of the light source which is located on the roof of personnel vehicles and directs at least one upward, non-horizontal beam of light.

b. Description of Related Art

The prior art is replete with distress signaling devices, emergency lights and the like for use by law enforcement personnel and private citizens. As far as the present inventor is aware, however, there is no disclosure in the prior art of a system for an officer, emergency response personnel or military personnel to remotely activate a distress beacon secured to an emergency, military or police vehicle to signal to other personnel that one is in need of immediate assistance. The most relevant prior art known to the inventor is as follows. The following patents are representative of distress signal series:

U.S. Pat. No. 3,290,597 issued to G. R. Denny et al. on Dec. 6, 1966, entitled, "Emergency Assistance Radio Signaling System," discloses a system for sending a distress signal to a central station using either a battery powered portable transmitter or a vehicle mounted transmitter. The portable transmitter is used to send a signal to radio equipment in the officer's vehicle, which then transmits a distress signal to a central station. The signal may be a message identifying the officer who sent the signal, and may be recorded just before the officer leaves the vehicle in order to convey the basic situation the officer is about to enter. No means for visually identifying the location of the officer's vehicle is provided, however.

U.S. Pat. No. 3,469,235 issued to E. C. Devlin et al. on Sep. 23, 1969, entitled "Vehicle Warning Light and Device," discloses a distress or warning light mounted to the outside of a passenger vehicle that can be activated by any occupant of the vehicle to alert those outside of an emergency situation occurring within the vehicle. While Devlin therefore teaches a vehicle distress light, such light is not in the form of a beacon to be activated by law enforcement officers to indicate their location to other officers either responding to a distress call or who happen to be in the vicinity, but otherwise would have no knowledge of the distress situation.

U.S. Pat. No. 3,601,797 issued to R. H. O'Connor on Aug. 24, 1971, entitled "Illuminated Distress Signal Device," discloses a distress signal in the form of a balloon mounted on a base containing a light that is temporarily secured to the roof of a motor vehicle. In an emergency, the balloon is placed in the base, blown up, the base is placed on the vehicle roof, and a cord is plugged into a power source such as the vehicle cigarette lighter to activate the light. While useful for its particular intended purpose, such signaling device obviously would not be practical for use by law enforcement officers encountering an armed criminal or the like.

U.S. Pat. No. 3,723,725 issued to R. O. Jaeger on Mar. 27, 1973, entitled "Beacon Signaling Device," discloses an improved signaling device of a type that is to be mounted to the roof of an emergency vehicle having a light source surrounded by a colored outer housing. The outer housing has at least one transparent aperture that divides the housing into separate colored sections so that in use the light emits colored light in the red/blue/amber emergency colors through the housing, but also emits a white light with a brightness and intensity that is not diminished by passing through the colored housing. Such light is illustrative of the large number of rotating beacon type emergency signal lights found in the prior art that are primarily designed to notify others that an emergency vehicle is on its way, rather than for use by law officers only upon encountering a life or death situation.

U.S. Pat. No. 3,863,999 issued to P. O. Muller on Feb. 4, 1975, entitled "Detachable Warning Light," discloses another vehicle emergency signaling device including both an audible alarm and flashing light in a housing mounted somewhere on the vehicle's exterior.

U.S. Pat. No. 3,947,815 issued to H. M. Muncheryan on Mar. 30, 1976, entitled "Automobile Emergency-Alerting System," discloses another system by which an occupant of a vehicle can signal to those outside the vehicle that assistance is needed, in this case by activating a "HELP" sign mounted on the outside of the vehicle using a remote control or manual switch in the vehicle. Such signal is designed to notify those outside of a vehicle of trouble occurring within the vehicle, although it could notify those passing by of trouble occurring in the immediate vicinity outside the vehicle as well. The "HELP" sign mounted on the vehicle trunk and facing rearwardly is not highly visible in the same manner as an upwardly directed light beams of the distress beacon contemplated by the present inventor.

U.S. Pat. No. 4,058,794 issued to W. K. Menke on Nov. 15, 1977, entitled "Vehicle Beacon Control System," discloses a light control system for an emergency vehicle, wherein the conventional rotating beacons on the roof of the vehicle also are provided with side-facing flood lights which can be controlled independently of the rotating beacons and used as search lights. Such lights are not designed to be used as a distress signal, however.

U.S. Pat. No. 4,606,073 issued to A. Z. Moore on Aug. 12, 1986, entitled "Assistance Summoning System," discloses, similar to the Denny '597 patent discussed above, a system for a law enforcement officer to summon assistance comprised of a portable transceiver device that when activated signals or sends a prerecorded emergency message in a receiver device in the officer's vehicle to be transmitted to a central station. While such systems are useful in transmitting an emergency signal to those in radio communication with the officer in distress, there is no means for visually signaling the location of the officer's vehicle and that he or she is in distress to those not in communication with the officer.

U.S. Pat. No. 4,847,589 issued to H. L. Dobbins on Jul. 11, 1989, entitled "Visual and Auditory Signaling System," discloses a manually actuated emergency visual and audible signaling device wherein the nature of the help required can be signaled by varying the signaling sequence. Such device could be either handheld or attached to a vehicle body, and includes separate green and amber lights, which can be used to indicate that the user needs assistance by a "Need Help" indication, that there is a medical emergency, or that "Help is on the Way". Such device would not be useful, however, for emitting an upwardly directed highly visible beacon light distress signal to indicate that a law enforcement officer is in distress.

U.S. Pat. No. RE 34,677 issued to D. K. Ray et al. on Jul. 26, 1994 entitled "Automatic Emergency Locator System and Method," discloses an emergency response locator system for use in combination with the conventional "911" emergency call system, wherein when a "911" emergency call is placed, the system causes a strobe light at the address of the call to start flashing, to lead emergency personnel to the exact location more quickly. While there are numerous prior art systems including visual indicators to aid emergency personnel in finding the location of a "911" call, none of such systems could be used in the same manner as the distress signaling device of the present invention.

U.S. Pat. No. 5,389,935 issued to D. Dronault et al. on Feb. 14, 1995, entitled "Automatic System for Locating and Identifying Vehicles in Distress," discloses a system for locating vehicles in distress wherein when a radio distress signal is sent from a vehicle upon the occurrence of an emergency situation, a network of direction finders situated at various locations measures the angle of arrival of the distress signal, which may be a radiogoniometer, and a computer system interprets such information to determine the location of the vehicle and to contact and direct rescue teams to the site of such vehicle. Dronault does not disclose the use of a pinpointing light distress beacon system, however.

U.S. Pat. No. 5,422,632 issued to J. F. Bader et al. on Jun. 6, 1995, entitled "Programmable Emergency Signaling Device and System," discloses an emergency vehicle light signaling system that can be programmed to emit light in various patterns to provide a particular signal or warning. Such light patterns are indicated as being either stationary or rational, and the light beams emitted can be either narrow beams or wide beams. Although such lights can be variably programmed, a light signaling system that emits a distress signal light beacon which can be activated remotely by an officer encountering a life threatening situation is not disclosed.

U.S. Pat. No. 5,892,439 issued to R. E. Molina Torres et al. on Apr. 6, 1999, entitled "Vehicle Warning and Help Apparatus and Method," discloses a warning system comprised of a light box mounted inside a vehicle and electrically connected to a control panel, with the light box housing red and yellow lights that are visible through the vehicle windshield and a horn which is mounted in a vehicle window or the like. The device can be activated either automatically in the event of an accident or manually, and may signal various conditions ranging from maximum to minimum alert. Such arrangement is primarily designed to alert oncoming traffic to the presence of an emergency and to proceed cautiously, rather than to alert all of those people within view of an upwardly directed spotlight to a law enforcement officer in need of immediate assistance, however.

U.S. Pat. No. 6,549,121 issued to P. F. Povey et al. on Apr. 15, 2003, entitled "Illuminated Emergency Signaling Device," discloses a battery powered emergency LED light secured in a housing and designed to aid rescue or emergency personnel in initially locating an emergency site or warning of an emergency condition. The main improvement of the Povey emergency beacon or signal appears to be a plastic race (18) surrounding the light which reflects such light so that it is emitted around the periphery of the device.

U.S. Patent Pub. No. 2002/0070929 filed by W. C. Hunter and published on Jun. 13, 2002, entitled "Emergency Assistance Device," discloses a light assembly which when activated by a remote control unit flashes a distress message and emits a siren or alarm to indicate to emergency personnel the address or location of a dwelling in which an occupant needs assistance, in response to a "911" call or the like. Many patents containing variations of this basic theme can be found in the prior art.

U.S. Patent Pub. No. 2005/0099317 filed by J. C. Pederson and published on May 12, 2005, entitled "LED Light Bar," discloses a multiple LED light warning signal system for use by police or other emergency personnel, in which rows of LED lights are mounted on a base. Pederson discloses numerous different embodiments of such invention, and any number of different types of light signals may be emitted by such device, including both portable and vehicle mounted versions. While Pederson discloses use of the device as a spotlight, it does not appear that an upwardly pointing distress beacon light is disclosed or suggested. See also several related applications, including U.S. Patent Pub. No. 2005/0259434 published on Nov. 24, 2005, entitled "LED Light Stick Assembly."

Overall, therefore, while the prior art contains a large number of distress signaling devices, emergency warning lights and systems, and location assistance systems and methods, there remains a need for a distress or emergency signaling system and method that enables law enforcement personnel, as well as others such as military personnel, security guards, and the like who while on patrol or duty and suddenly encounter a condition where they are placed in imminent danger of a serious bodily injury occurring to send a distress signal that will be recognized as such not only by law enforcement personnel working for the same force, department or agency as the officer in danger, but also by law enforcement personnel from other departments or agencies as well as off-duty police officers who may be in the immediate vicinity and are able to provide assistance quickly, but whom otherwise would have no knowledge of such imminent danger to an officer and thus likely would not attempt to assist the officer. The distress signal therefore in addition must be highly visually perceptible and distinguishable from conventional emergency signals, lights, and the like, and the signal must be understood by federal, state and local personnel as identifying an officer in distress and thus also aid in help more quickly reaching the site. The present inventor has through significant personal experience as a law enforcement officer recognized such need, and as a result has developed an emergency distress beacon or signaling system that is mounted to the officer's patrol vehicle or the like and electrically connected to a control device which can be activated either manually in the vehicle or remotely via a portable activator or signaling device, and which if desired may be incorporated into the conventional radio signaling device already in use by officers in a particular station or department. Then, in a scenario where or when the officer believes he or she is in a possibly life threatening situation or in imminent danger of serious bodily harm or injury, the signaling device is used to activate the distress beacon, which activates a strong upwardly directed beam of light that is visible to those in the immediate vicinity both during the day and night. Furthermore, the signal device is visible underwater. The distress beacon will preferably be in the emergency colors already known and used by most law enforcement offers, and will be recognized as a distress call or signal by officers from different municipalities or departments not in radio communications with the officer in distress, which available officers can then respond to.

Notwithstanding the prior art, the present invention is neither taught nor rendered obvious thereby

SUMMARY OF INVENTION

The present invention relates to an emergency assistance beacon signal methodology for law enforcement, emergency and military personnel by which such personnel who encounter an imminent need for assistance or rescue while on duty in a vehicle, may utilize such methodology to invite the assistance or rescue of other such personnel, which includes: a.) upon a first law enforcement, emergency or military personnel determining that assistance or rescue is needed, the first law enforcement, emergency or military personnel activating a powerful light element attached to a law enforcement, emergency or military vehicle such that the powerful light directs a beam of light upwardly and non-horizontally from the vehicle; b.) upon a second law enforcement, emergency or military personnel recognizing the beam of light, traveling to a general area of the beam of light to locate the first law enforcement, emergency or military personnel and providing the first law enforcement, emergency or military personnel assistance or rescue.

In some preferred embodiments of the present invention methodology, the powerful light element is activated by the first law enforcement, emergency or military personnel by an activation mechanism selected from the group consisting of a vehicle-mounted activation system, a personnel-mounted wireless activation mechanism and a combination thereof.

In some preferred embodiments of the present invention methodology, whereupon, before use of the powerful upwardly directed light signal, a publicity program is engaged in to advise law enforcement, emergency or military personnel implicit meaning of an upwardly directed light beam emanating from a light source of a law enforcement, emergency or military vehicle.

In some preferred embodiments of the present invention methodology, in which the upwardly and non-horizontally directed beam of light projected from the top of the law enforcement vehicle is directed upwardly and non-horizontally with a variable color pattern.

In some preferred embodiments of the present invention methodology, in which the upwardly and non-horizontally directed light source is caused to move in a variable pattern.

In some preferred embodiments of the present invention methodology, in which the variable pattern imports a changing angularity to the light beam.

In some preferred embodiments of the present invention methodology, in which there are multiple beams of light directed upwardly and non-horizontally.

In some preferred embodiments of the present invention methodology, in which the multiple beams are differently colored.

In some preferred embodiments of the present invention methodology, in which the differently colored beams are periodically inclined with respect to each other.

In some preferred embodiments of the present invention methodology, upon activation of the powerful light element, the methodology further includes a wireless transmission to a remote control center signaling the need for personnel assistance or rescue.

In another embodiment of the present invention, an emergency assistance beacon signal system for law enforcement, emergency and military personnel by which such personnel who encounter an imminent need for assistance or rescue may utilize the system to invite the assistance or rescue of other such personnel, includes: a) a roof-mountable emergency signal device for mounting on the roof of a law enforcement, emergency or military vehicle, the device including an upwardly, non-horizontally directed powerful light source having at least one upwardly, non-horizontally directed beam of light adapted to be energized by an activation mechanism operable by a law enforcement, emergency and military personnel who is using the vehicle; and, b) the activation mechanism in proximity to and operable by the law enforcement, emergency and military officer who is using the vehicle.

In some preferred embodiments of the present invention system, the activation mechanism is selected from the group consisting of a vehicle-mounted activation system, a personnel-mounted wireless activation mechanism and a combination thereof.

In some preferred embodiments of the present invention system, the activation mechanism is a vehicle-mounted activation system, a personnel-mounted wireless activation mechanism.

In some preferred embodiments of the present invention system, the activation mechanism is a personnel-mounted wireless activation mechanism.

In some preferred embodiments of the present invention system, the personnel-mounted wireless activation mechanism is selected from the group consisting of a modified cell phone, a hand-operable remote control with personnel attachment means and a voice activated mechanism.

In some preferred embodiments of the present invention system, the upwardly, non-horizontally directed beam of light has a variable color pattern.

In some preferred embodiments of the present invention system, the upwardly, non-horizontally directed beam of light is moveable in a variable pattern.

In some preferred embodiments of the present invention system, the upwardly, non-horizontally directed powerful light source has a plurality of upwardly, non-horizontally directed beams of light adapted to be energized by an activation mechanism operable by a law enforcement, emergency and military personnel who is using the vehicle.

In some preferred embodiments of the present invention system, the multiple beams are differently colored.

In some preferred embodiments of the present invention system, the system activation mechanism further includes a wireless transmission means for transmission to a remote control center to signal the need for personnel assistance or rescue.

In some preferred embodiments of the present invention system, the system further includes transmission means from at least one remote control center to the signal device for remote activation thereof.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

It is therefore an object of the present invention to provide an emergency distress signaling system and method for use by law enforcement officers and other security personnel whereby when an officer encounters a situation in which he or she is potentially in imminent danger of incurring serious bodily injury or harm, such as when encountering an armed offender, an emergency stress beacon mounted on the officer's patrol vehicle is activated to alert other officers both on-duty and working for the same department as the officer in distress as well as off-duty or working for a different department or agency who are in the vicinity of the officer in distress that such officer needs immediate assistance.

It is a further object of the invention to provide a system for a law enforcement officer upon encountering a situation where he or she is likely in imminent danger of serious bodily harm to activate a signal beacon mounted to such officer's law enforcement vehicle that can be easily seen by other law enforcement officers both during the day and night and serves as a visual indicator to other law enforcement officers both in and not in radio communication with such officer that the officer is in need of immediate backup or assistance.

A still further object of the invention is to provide an emergency distress beacon light to notify law enforcement personnel that a fellow law enforcement officer is in need of immediate assistance and has encountered a dangerous and potentially life threatening situation, wherein the beacon is comprised of lights, e.g. lasers in the emergency distress colors yellow, blue, and red and can be activated remotely by an officer in distress.

A still further object of the invention is to provide an emergency distress beacon that will aid law enforcement personnel in visually locating an emergency site where an officer is in need of immediate assistance.

A still further object of the invention is to provide an emergency signal which can be easily perceived as having an emergency signaling function rather than a mere caution and marking signal or a signal indicating that a police vehicle is involved.

A still further object of the invention is to provide an easily perceived signal that in proper circumstances is powerful enough to be detected at significant distances, and that is secured in a waterproof and airtight housing mounted on a law enforcement vehicle.

A still further object of the invention is to provide a distress beacon that when activated acts as a crime deterrent by signaling to criminals or potential offender that an officer has called for backup.

Additional objects, advantages and uses of the invention will become evident from reference to the description of the invention and the attached drawing figures.

Law enforcement personnel are of course active in virtually all countries of the world, and are usually affiliated with a particular department or agency. For example, in the United States, federal officers are employed by agencies falling under the Department of Justice and Department of Homeland Security, including the Federal Bureau of Investigation (FBI), U.S. Marshals Service, Bureau of Alcohol, Tobacco, Firearms, and Explosives, the Drug Enforcement Administration, U.S. Customs and Border Protection and the U.S. Secret Service. In addition, there are over 17,000 state and local law enforcement agencies in the United States. Police departments of course perform a wide range of law enforcement and public safety services for their state and local communities. Typical activities of police officers include enforcement of city and state laws, protecting residents and property from criminal activity, traffic control, responding to traffic accidents, investigating complaints including misdemeanors and felonies, preventative patrol activities, and administration of crime prevention programs. In addition, police officers provide many additional services or aid to the public and in the interest of the public protection, safety, and convenience, such as responding to calls for medical assistance, fires, accidents and disasters, citizen transport, and park and house checks.

As a rule, some activities of law enforcement officers are inherently more dangerous than others. However, there can be no doubt that such employment is, by its very nature, dangerous, since at any moment an officer may encounter a circumstance which even if initially appearing to be relatively non-threatening could quickly degenerate into an extreme situation where the officer is in danger of incurring serious bodily harm or injury, or where a deliberate attempt to cause death to the officer by an offender occurs. Many efforts have been made to increase the effectiveness and safety of all law enforcement personnel. For example, today most new law enforcement vehicles are equipped with sophisticated communications equipment and other technologies that essentially have converted the standard law enforcement vehicle into a mobile office. Such technology includes fully functional computers (rather than dummy terminals) that give officers access to databases of stolen vehicles, criminal records, and the like, mostly via the databases of the National Crime Information Center (NCIC). Immediate access to these databases of basic information is extremely helpful to officers in many situations, such as when stopping a vehicle along a highway, as an officer can more quickly discern information such as the registered owner of the vehicle, if the listed owner has a history of violence, whether the vehicle is listed as stolen, and the identities and histories of persons in the vehicle. As a result, an officer can often, although not always, better estimate the potential volatility and threat level associated with an event.

Any such additional information can be extremely helpful for an officer to avoid being placed in imminent danger. Upon the occurrences of a sudden violent act or threat, officers have little time not only to react and protect themselves, but also to call for backup assistance. While virtually all law enforcement vehicles include equipment that enables officers to communicate with other officers as well as directly with a headquarters or central station, such equipment is not readily accessible once an officer leaves the vehicle. Thus, officers will typically also carry a portable communications device such as a police radio so they can communicate easily with other officers and a central station when away from their vehicle. Upon receiving a radio call for help from an officer in imminent danger of incurring serious injury or death, however it is critical that the response and assistance arrive as quickly as possible. Such response, however, could be delayed for several reasons. First, the number of on-duty officers in a given area may be limited, particularly in rural areas or at night, so that officers are more spread out and isolated. Often, in rural areas, an officer patrolling the town or borough in which he or she works may respond to a call from an officer in a neighboring town or borough, so that in an emergency situation time is already an issue. Second, the closest on-duty officers to the scene may be occupied with another emergency call, and the arrival of officers from further away takes additional time. Third, officers responding to the call may have difficulty quickly locating the exact position of the distress signal, which delay even if short, could prove serious or even deadly to the officer in distress. In addition to police officers, others such as privately employed security guards may also unexpectedly find themselves in danger of incurring imminent harm, and thus require immediate assistance.

Thus, while there may be a delay in the case of a municipal or city officer in radio communication with an officer in distress and in reaching the scene to aid such officer, and the situation is frequently even more extreme for state highway patrolmen and the like, there may be other state or federal officers, or off-duty officers, that are close enough to provide more immediate assistance. However, such officers would not have received any radio distress signal, and thus would not even be aware of the situation. There is thus a need for a system for an officer who is in imminent danger of incurring serious bodily harm or even death to communicate such condition immediately not only to law enforcement officers at a central station or the like by radio who are on duty and members of the same force as the officer in distress, but also for alerting officers employed by different law enforcement authorities or off-duty officers who may be in the area of the officer in danger. The signaling device should be able to be activated remotely by a portable transmitter carried by a law enforcement officer, and the signal emitted should be clearly visible and readily distinguishable from the signals emitted by other conventional emergency signaling devices. The signal should furthermore be able to pinpoint the area where aid is required and not just the general vicinity.

Figure 1:
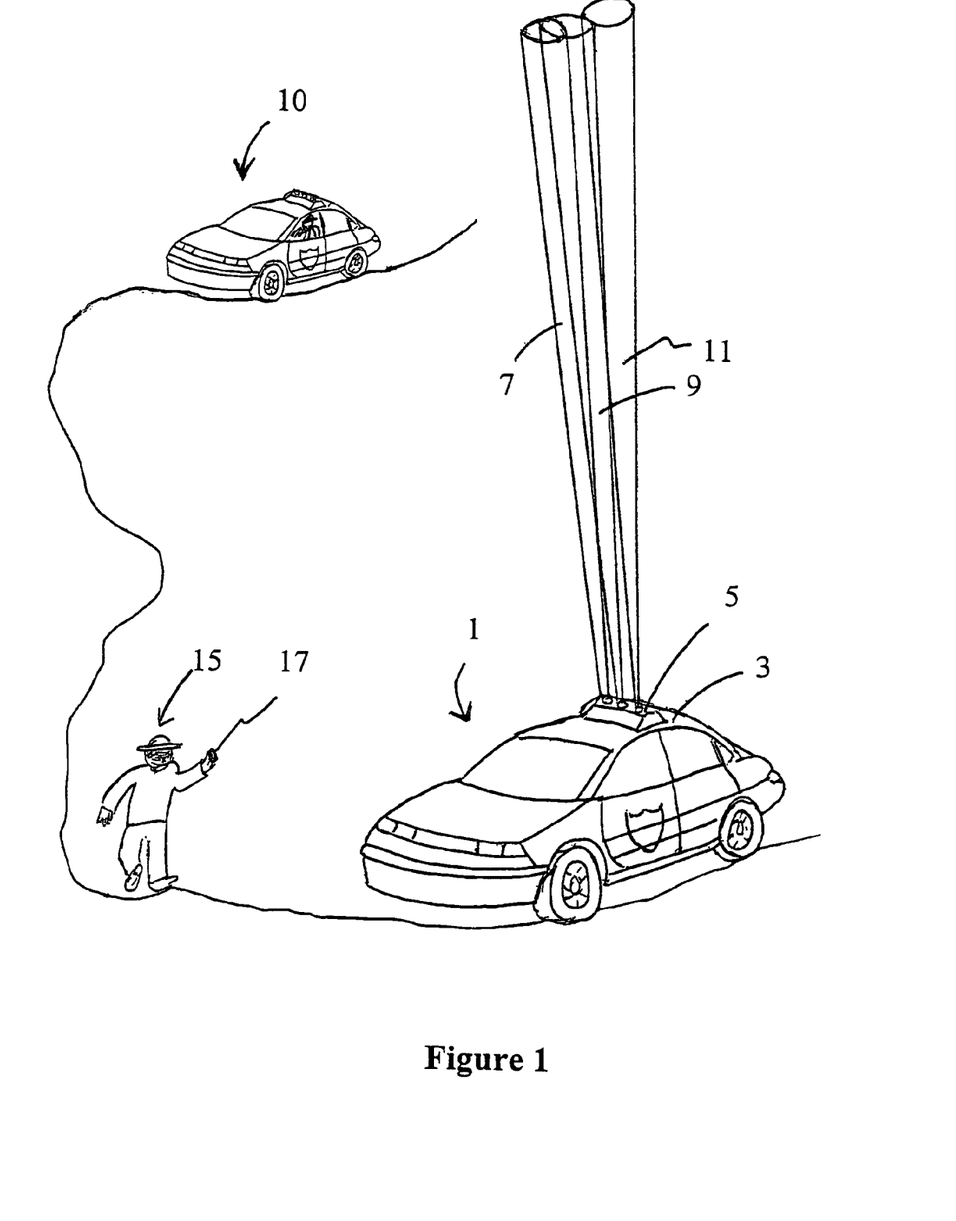
FIG. 1 is a schematic of the present invention emergency assistance beacon signal methodology and system for law enforcement, emergency and military personnel.

Referring now to the drawings wherein like reference numerals designate corresponding parts throughout the several views, FIG. 1 is a schematic of the present invention emergency assistance beacon signal methodology and system for law enforcement, emergency and military personnel. In the embodiment, there is shown a vehicle 1, law enforcement, emergency and military personnel 15 and a vehicle 10.

The method and system is employed by law enforcement, emergency and military personnel 15 when encountering an imminent need for assistance or rescue while on duty in the vehicle 1. Such personnel 15 may be a police officer, a fire fighter, a soldier, a state trooper, an FBI agent, a national guard employee, a rescue squad paramedic, a homeland security agent and the like.

An example of the use of the present invention emergency assistance beacon signal methodology and system includes the personnel, in this case, a police officer 15 who was cruising in a police cruiser vehicle 1 when he encountered a traffic jam as he was approaching a bridge. He drove as far as he could and then exited the vehicle 1 and proceeded to walk on foot to obtain information on the reason for the traffic situation. Upon approaching the bridge, he observed that the bridge had collapsed and one automobile with a driver and a passenger was embedded in the rubble from the bridge. The automobile driver and passenger had to be immediately rescued and traffic had to be immediately diverted. Upon the police officer 15 determining that assistance or rescue was needed, the police officer had to activate a powerful light element 5 attached to a roof 3 of the vehicle 1 such that the powerful light element 5 would direct a beam of light upwardly and non-horizontally from the vehicle 1. He immediately reached for a personnel-mounted wireless mechanism 17 for activating the powerful light element 5. In this case, the personnel-mounted wireless mechanism 17 had been hanging on his belt and, as shown, had been placed in his hand for activation. The details of the belt hung personnel-mounted wireless mechanism are described in more detail hereinafter by FIG. 3.

The powerful light element 5 directs at least a beam of light upwardly and non-horizontally from the vehicle 1. In this case, there are a plurality of light beams 7, 9 and 11. A second law enforcement, emergency or military personnel, who was driving vehicle 10 in close proximity about a quarter of a mile away, saw the plurality of light beams 7, 9 and 11 and is alerted that there is need of assistance or rescue of other law enforcement, emergency and military personnel. Upon a second law enforcement, emergency or military personnel recognizing the beam of light, the driver of vehicle 10 traveled to a general area of the beams 7, 9 and 11 of light to locate the police officer 15 and vehicle 1 to provide assistance regarding the collapsed bridge, the occupants of the buried automobile and the traffic situation.

There is an optional signal to a remote control center signaling the need for personal assistance or rescue. In this case upon the police officer 15 activating the powerful light element 5, a wireless transmission to the local police department signaling the need for personnel assistance or rescue was sent.

Figure 2:
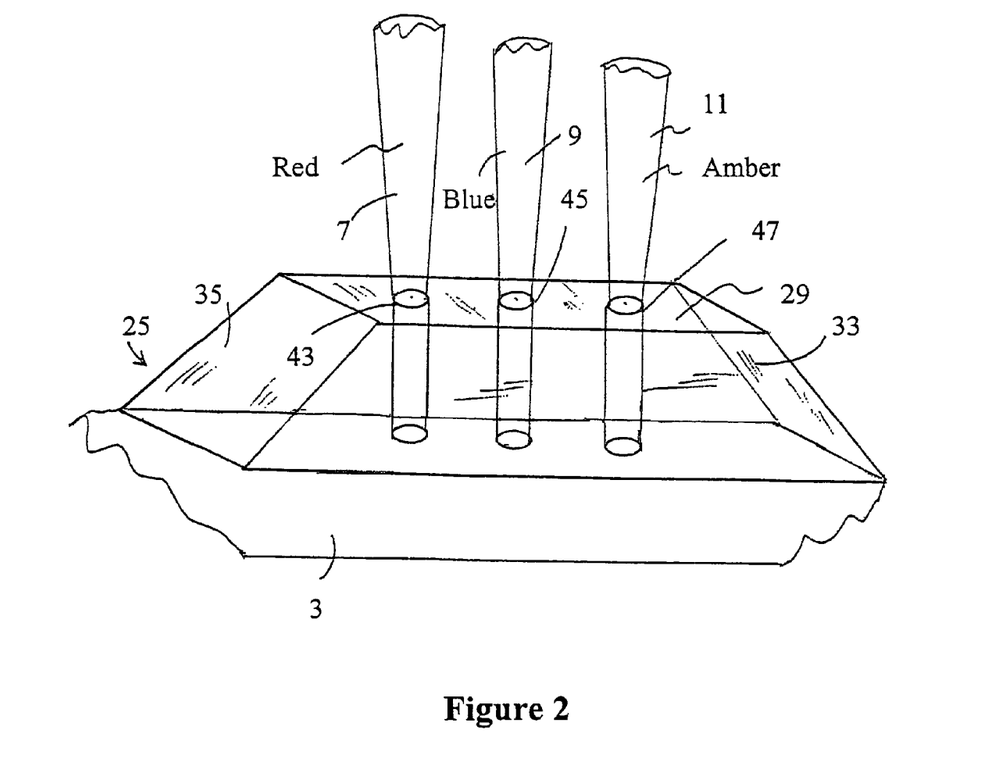
FIG. 2 is a cut view of a roof of a vehicle with a plurality of light beams of the present invention.

FIG. 2 is a cut view of the roof 3 of vehicle 1 with the powerful light (not numbered in this view) having the plurality of light beams 7, 9 and 11 of the present invention. The powerful light includes a housing 25, and cylinders 43, 45 and 47 for surrounding the plurality of light beams 7, 9 and 11, respectively. The powerful light 5 directs each one of the plurality of light beams 43, 45 and 47 upwardly and non-horizontally from the vehicle 1. The cylinders 43, 45 and 47 are preferably metallic and may be covered by a clear glass to further protect the powerful light.

The housing 25 is waterproof and airtight and includes a top 29, a bottom 41, front 31, as well as sides 33 and 35. The housing 25 is preferably made from clear plexiglass, as are many emergency light bars. In the alternative, stainless steel, aluminum or other material with suitable strength and durability may be used. The top 29 is preferably made from a transparent material such as shatterproof and bulletproof glass.

Before use of the powerful upwardly and non-horizontally directed light beams 43, 45 and 47, a publicity program is engaged in to advise law enforcement, emergency or military personnel implicit meaning of an upwardly and non-horizontally directed light beam emanating from the light source 5 of the law enforcement, emergency or military vehicle 1.

Each of the upwardly directed beams 7, 9 and 11 of light projected from the top 27 of the vehicle is directed upwardly with a variable color pattern. The upwardly directed light source 5 may be caused to move in a variable pattern, which imports a changing angularity to the light beam.

There may be a single beam of light or multiple beams of light directed upwardly and non-horizontally. When there are multiple beams, the multiple beams may be differently colored. For example, light beams 7 may be red, light beam 9 may be blue and light beam 11 may be amber. The differently colored beams may be periodically inclined with respect to each other.

Figure 3:
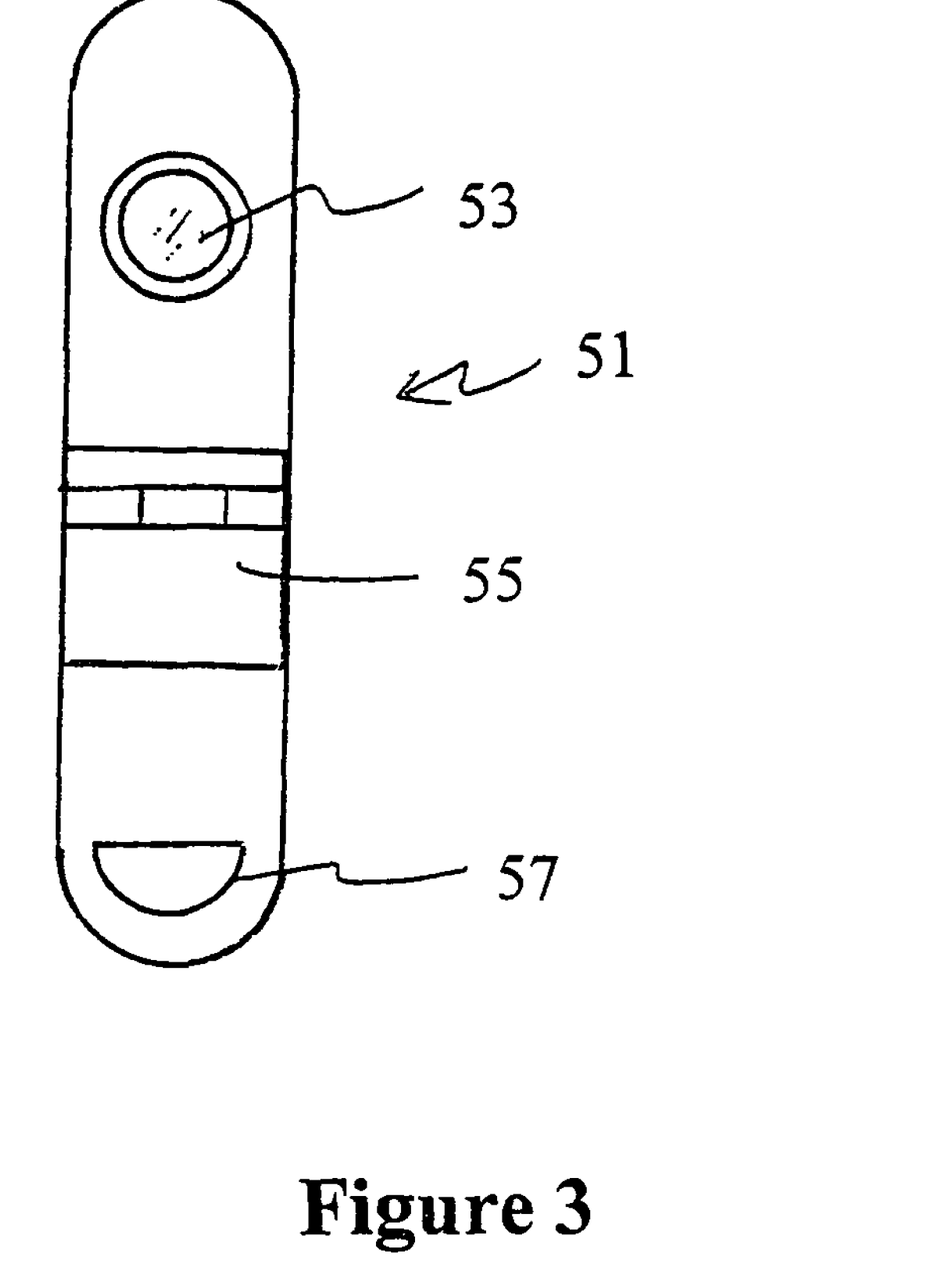
FIG. 3 is a front view of a personnel mounted wireless activation mechanism of the present invention.

FIG. 3 is a front view of a personnel mounted wireless activation mechanism 51 of the present invention. The personnel mounted wireless activation mechanism 51 includes an activation mechanism 53, an information screen 55 and a personnel attachment means, in this case, loop 57. The activation mechanism 53 activates the powerful light mounted on a roof of a vehicle. The information screen 55 displays communication from a remote center or from another law enforcement, emergency of military personnel vehicle. The loop 57 attaches to a belt of the personnel through a chain or hook.

Other personnel mounted wireless activation mechanism includes a modified cell phone and a voice activated mechanism. A modified cell phone is a cell phone that has been modified to include a signal for activating the powerful light source. A voice-activated mechanism uses the microphone on either shoulder of law enforcement, emergency and military personnel for amplifying a spoken keyword and generating a signal to activate the powerful light source.

Figure 4:
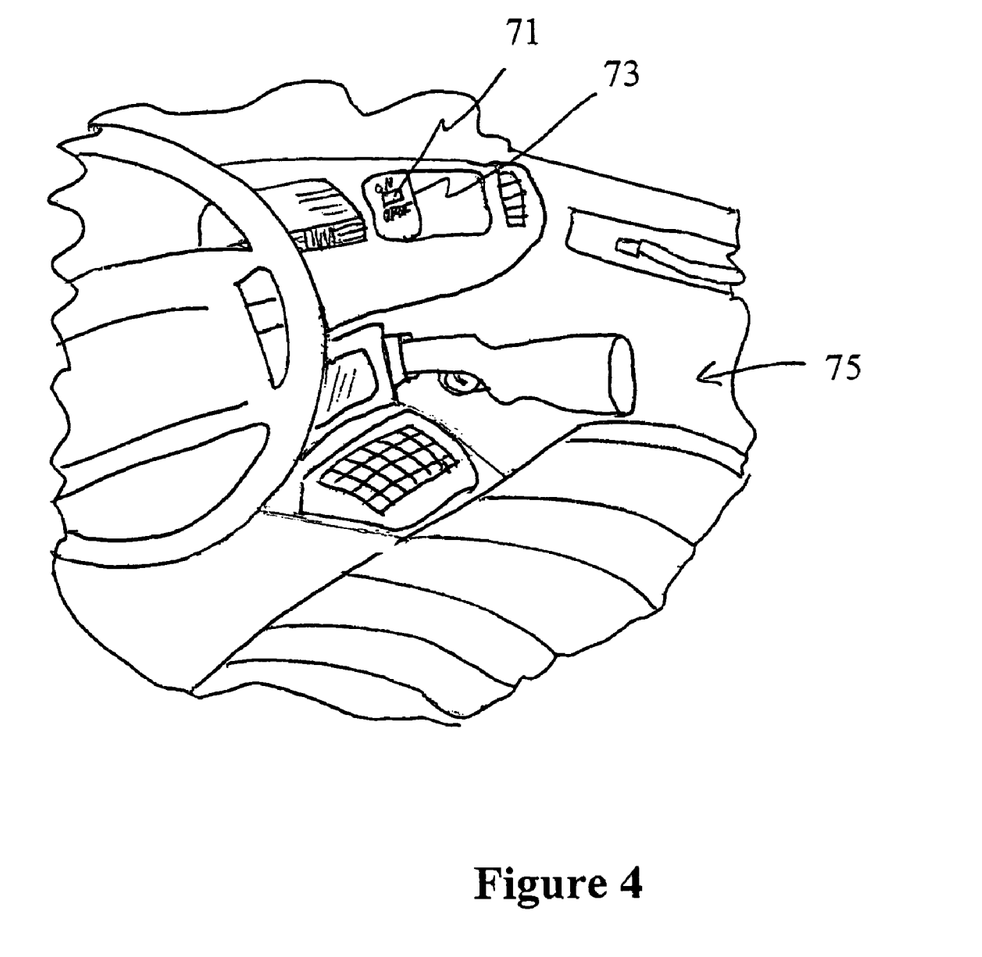
FIG. 4 is a front view of a dashboard of the vehicle, illustrating a vehicle-mounted activation mechanism.
Figure 5:
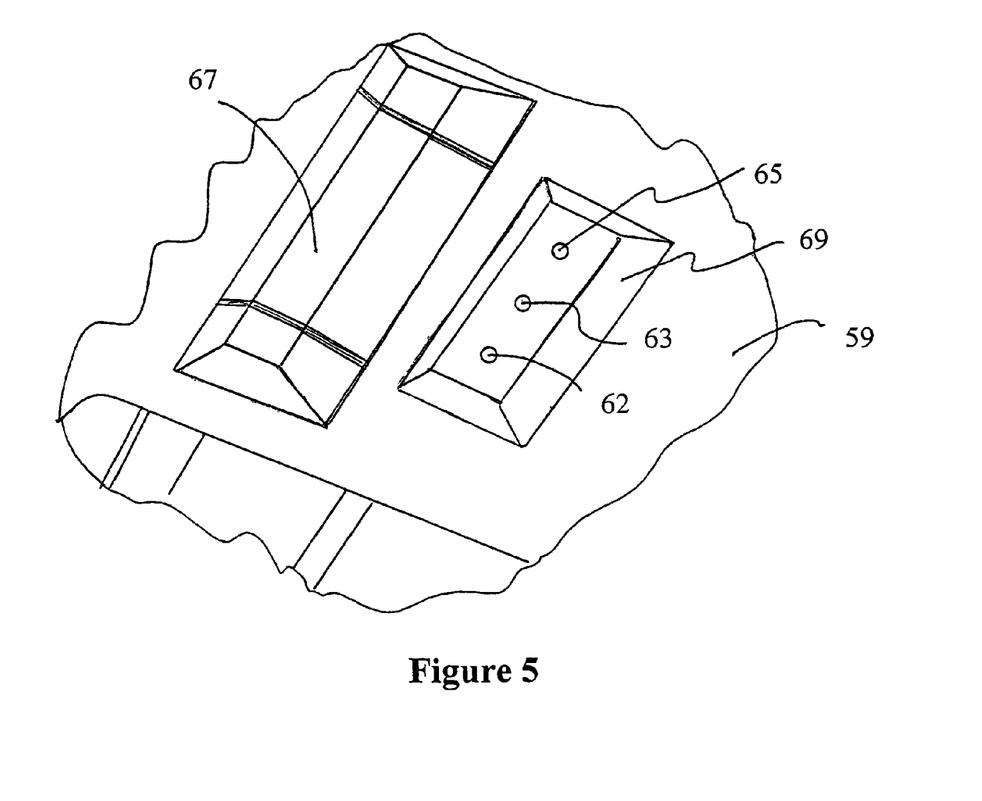
FIG. 5 is a perspective view of the roof of the vehicle, illustrating a powerful light element.

FIG. 4 is a front view of a dashboard 71 of a vehicle 75, illustrating a vehicle-mounted activation mechanism 73. The vehicle-mounted activation mechanism 73 is mounted to the dashboard 71 of the vehicle. The vehicle-mounted activation mechanism 73 includes an on/off switch. Upon a first law enforcement, emergency or military personnel determining that assistance or rescue is needed, the first law enforcement, emergency or military personnel activates, by moving the vehicle-mounted activation mechanism to on, a powerful light element attached to a law enforcement, emergency or military vehicle such that the powerful light directs a beam of light upwardly and non-horizontally from the vehicle. An example of when the vehicle-mounted activation mechanism is used is when a soldier is shot. A soldier in a vehicle would immediately move the vehicle-mounted activation mechanism to on to invite emergency personnel for rescue of the soldier. The light beam would alert the second personnel of the vicinity of the vehicle, FIG. 5 is a perspective view of a roof 59 of a vehicle, illustrating a powerful light element 69. The powerful light element 69 is mounted to the roof 59 and includes a plurality of cylinders 61, 63 and 65 for directing a plurality of light beams (not shown). Mounted behind the powerful light element 69 is an emergency roof light 67.

Each of the upwardly directed beams of light projected from the roof 59 of the vehicle is directed upwardly with a variable color pattern. The upwardly directed light element 69 may be caused to move in a variable pattern, which imports a changing angularity to the light beam.

There may be a single beam of light or multiple beams of light directed upwardly and non-horizontally. When there are multiple beams, the multiple beams may be differently colored. For example, light from cylinder 61 may be red, light from cylinder 63 may be blue and light from cylinder 65 may be amber. The differently colored beams may be periodically inclined with respect to each other.

Figure 6:
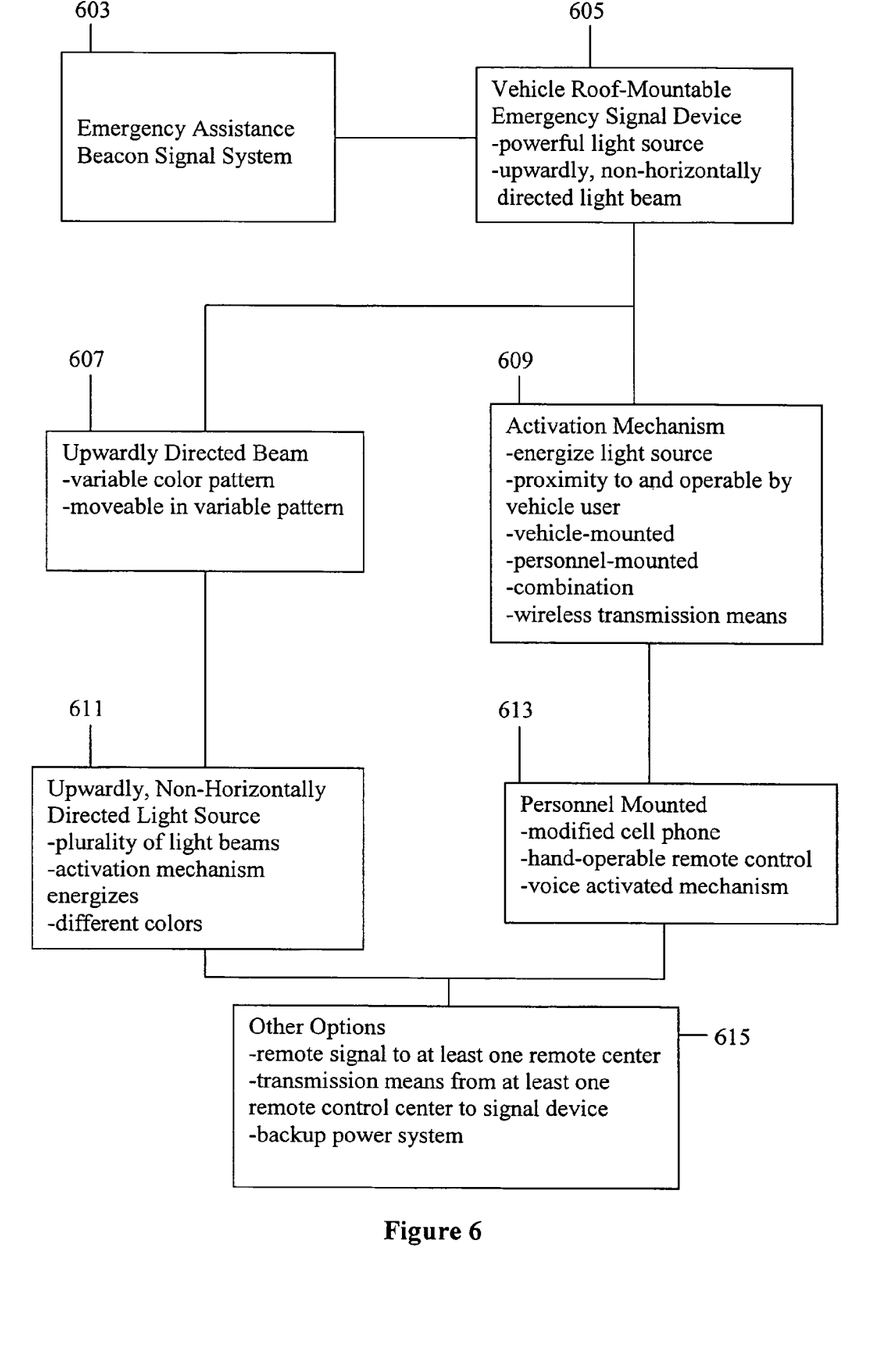
FIG. 6 is a schematic of the present invention emergency assistance beacon signal system.

FIG. 6 is a schematic of a present invention emergency assistance beacon signal system 603. Referring to box 605, the emergency assistance beacon signal system for law enforcement, emergency and military personnel by which such personnel who encounter an imminent need for assistance or rescue may utilize the system to invite the assistance or rescue of other such personnel. It includes: a) a roof-mountable emergency signal device for mounting on the roof of a law enforcement, emergency or military vehicle. The roof mountable emergency signal device includes an upwardly, non-horizontally directed powerful light source having at least one upwardly, non-horizontally directed beam of light.

Referring to box 609, the powerful light source is adapted to be energized by an activation mechanism operable by a law enforcement, emergency or military personnel who is using the vehicle. The activation mechanism is in proximity to and operable by the law enforcement, emergency or military personnel who is using the vehicle. The activation mechanism only energizes the one specific powerful light source located on the vehicle which is being used by the law enforcement, emergency or military personnel. Furthermore, the activation mechanism is selected from the group consisting of a vehicle-mounted activation system, a personnel-mounted wireless activation mechanism and a combination thereof. The activation mechanism may be a vehicle-mounted activation system, a personnel-mounted wireless activation mechanism and a combination thereof.

Referring to box 613, the personnel-mounted wireless activation mechanism is selected from the group consisting of a modified cell phone, a hand-operable remote control with personnel attachment means and a voice activated mechanism. A modified cell phone is a cell phone that has been modified to include a signal for activating the powerful light source. A hand operable remote control is preferably carried one's belt and is described in more detail in FIG. 3 hereinabove. A voice-activated mechanism uses the microphone on either shoulder of law enforcement, emergency and military personnel for amplifying a keyword and generating a signal to activate the powerful light source. A key phrase such as "Activate the Lights", "Help" or the like would be said into the microphone and when it is on, the appropriate signal would be transmitted. The system activation mechanism may further include a wireless transmission means for transmission to a remote control center to signal the need for personnel assistance or rescue.

Referring to box 607, the upwardly directed beam of light may have a variable color pattern and may be moveable in a variable pattern.

Referring to box 611, the upwardly, non-horizontally directed powerful light source has a plurality of upwardly, non-horizontally directed beams of light adapted to be energized by an activation mechanism operable by a law enforcement, emergency and military personnel who is using the vehicle. The multiple beams may be differently colored.

Referring to box 615, other options include a wireless remote signal transmitted to at least one remote control center when the powerful light element is activated. When the at least one remote control center fails to receive the wireless remote signal for reasons stated hereinafter, an alternative remote control center is viewed within the scope of the emergency assistance beacon signal methodology and system to receive the failed remote signal transmitted to the remote control center. A remote control center may fail to receive a signal due to a power failure, natural calamities such as torrential rains as well as excessive snow storm accumulations, terrorism attacks, fires, flooding, electrical power plant failures, and the like.

It is well known that permanent remote control centers, such as a law enforcement department, a firehouse, a rescue squad, a military base, an emergency response site, and the like have emergency backup systems. However, there are also alternative remote control centers situated in a different location from the primary remote control center. When there is a problem at the primary remote control center, such as not receiving the signal from the wireless remote of the beacon signal methodology and system, the alternative remote control center is automatically contacted by remote wireless signal to be notified of the need for personnel assistance or rescue. In such instances, the backup alternative remote control center may be temporary, only being contacted when the primary remote control center fails to receive a signal. Thus, the methodology and system provides for the most part a fail safe system for identifying the need for emergency assistance or rescue.

Another option is a transmission means from at least one remote control center to the signal device for remote activation thereof. A law enforcement, emergency and military personnel may not respond to a remote control center call because a personnel, such as a fire fighter is down under attack by a bear. One preferred option is a wireless capacity for the remote control center to signal to the non-responding personnel vehicle to activate the beacon signal system. This will enable third party vehicles to locate the non-responding personnel vehicle.

Another option is a backup power system such as an emergency battery. If the electrical system in a vehicle fails, the backup power system will still allow the powerful light element to activate.

To summarize, the present invention thus provides a methodology and system invention for law enforcement, emergency and military personnel in danger who activate an upwardly, non-horizontally powerful light source to alert other law enforcement, emergency and military personnel in the area of the need for immediate assistance. The powerful light source provides rapid visual location of at least one upwardly, non-horizontally beam of light from a vehicle roof.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An emergency assistance beacon signal methodology for law enforcement, emergency and military personnel by which such personnel who encounter an imminent need for assistance or rescue while on duty in a vehicle, may utilize such methodology to invite the assistance or rescue of other such personnel, which comprises:
   a.) upon a first law enforcement, emergency or military personnel determining that assistance or rescue is needed, said first law enforcement, emergency or military personnel activating a powerful light element attached to a law enforcement, emergency or military vehicle such that said powerful light element directs a plurality of beams of light upwardly and non-horizontally from said vehicle wherein said light beams form patterns having at least two features such that a first pattern feature is color and a second pattern feature is inclination of said light beams relative to each other; and,
   b.) upon a second law enforcement, emergency or military personnel recognizing said beam of light, traveling to a general area of said beam of light to locate said first law enforcement, emergency or military personnel and providing said first law enforcement, emergency or military personnel assistance or rescue.

2. The methodology of claim 1 wherein said powerful light element is activated by said first law enforcement, emergency or military personnel by an activation mechanism selected from the group consisting of a vehicle-mounted activation system, a personnel-mounted wireless activation mechanism and a combination thereof.

3. The methodology of claim 1 whereupon, before use of said powerful upwardly and non-horizontally directed light signal, a publicity program is engaged in to advise law enforcement, emergency or military personnel implicit meaning of an upwardly directed light beam emanating from a light source of a law enforcement, emergency or military vehicle.

4. The methodology of claim 1 wherein said powerful light element includes a housing and a plurality of cylinders surrounding said plurality of light beams.

5. The methodology of claim 1 in which said upwardly and non-horizontally directed light beams is caused to move in a variable pattern.

6. The methodology of claim 4 in which said variable pattern imports a changing angularity to the light beams.

7. The methodology of claim 6 wherein each of said plurality of beams are differently colored.

8. The methodology of claim 7 in which said differently colored beams are periodically inclined with respect to each other.

9. The methodology of claim 1 wherein upon activation of said powerful light element, said methodology further includes a wireless transmission to a remote control center signaling the need for personnel assistance or rescue.

10. An emergency assistance beacon signal system for law enforcement, emergency and military personnel by which such personnel who encounter an imminent need for assistance or rescue may utilize said system to invite the assistance or rescue of other such personnel, which comprises:
    a) a roof-mountable emergency signal device for mounting on the roof of a law enforcement, emergency or military vehicle, said device including an upwardly, non-horizontally directed powerful light element having a plurality of upwardly, non-horizontally directed beams of light forming patterns having at least two features such that a first pattern feature is color and a second pattern feature is inclination of said light beams relative to each other, wherein said plurality of light beams are adapted to be energized by an activation mechanism operable by a law enforcement, emergency and military personnel who is using said vehicle; and,
    b) said activation mechanism in proximity to and operable by said law enforcement, emergency and military officer who is using said vehicle.

11. The system of claim 10 wherein said activation mechanism is selected from the group consisting of a vehicle-mounted activation system, a personnel-mounted wireless activation mechanism and a combination thereof.

12. The system of claim 10 wherein said activation mechanism is a vehicle-mounted activation system.

13. The system of claim 10 wherein said activation mechanism is a personnel-mounted wireless activation mechanism.

14. The system of claim 13 wherein said personnel-mounted wireless activation mechanism is selected from the group consisting of a modified cell phone, a hand-operable remote control with personnel attachment means and a voice activated mechanism.

15. The system of claim 14 wherein said upwardly, non-horizontally directed beam of light has a variable color pattern.

16. The system of claim 10 in wherein said upwardly, non-horizontally directed beams of light are moveable in a variable pattern.

17. The system of claim 16 in wherein each of said plurality of light beams are differently colored.

18. The system of claim 17 wherein said differently colored beams are periodically inclined with respect to each other.

19. The system of claim 10 wherein said system activation mechanism further includes a wireless transmission means for transmission to a remote control center to signal the need for personnel assistance or rescue.

20. The system of claim 10 wherein said system further includes transmission means from at least one remote control center to said signal device for remote activation thereof.

21. The methodology of claim 10 wherein said powerful light element includes a housing and a plurality of cylinders surrounding said plurality of light beams.

\* \* \* \* \*